Oct. 9, 1945.    F. E. WOLCOTT    2,386,532
COFFEE MAKER
Filed Feb. 17, 1943
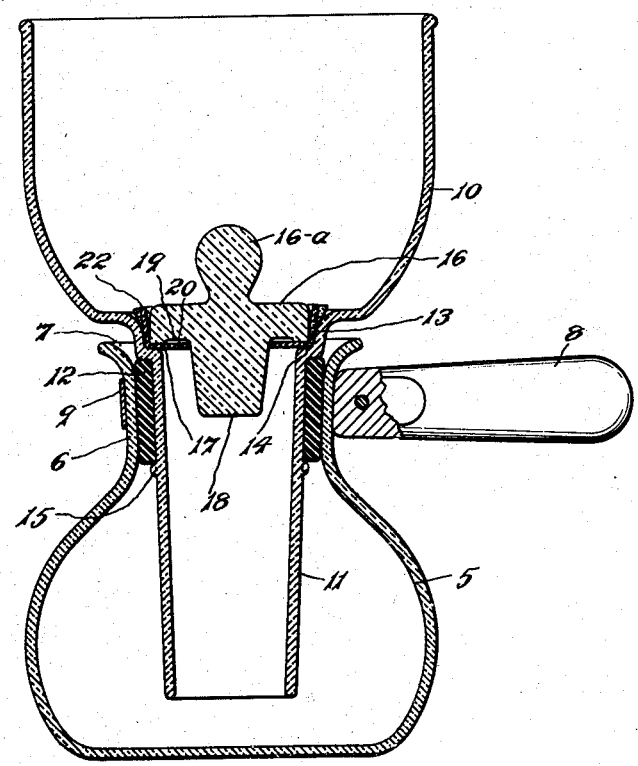
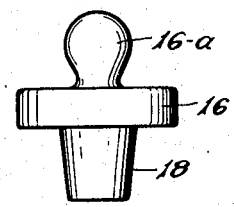
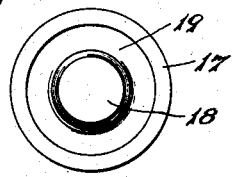
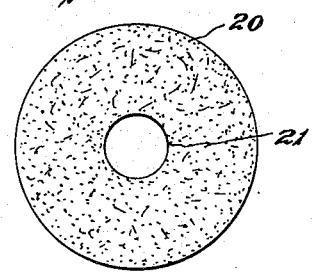
INVENTOR.
FRANK E. WOLCOTT.
BY Louis V. Lucia
ATTORNEY.

Patented Oct. 9, 1945

2,386,532

UNITED STATES PATENT OFFICE 2,386,532

COFFEE MAKER

Frank E. Wolcott, West Hartford, Conn., assignor to The Silex Company, Hartford, Conn.

Application February 17, 1943, Serial No. 476,196

1 Claim. (Cl. 210—162)

This invention relates to coffee makers and more particularly to those of the vacuum type.

It is well known that the efficiency of vacuum type coffee makers depends materially upon the allowance of a proper amount of time for the liquid in the upper bowl of the coffee maker to become infused with the coffee grounds therein before it returns to the lower bowl as coffee. It has been found that when liquid, or hot water, is permitted to flow from the upper into the lower bowls in too short a time, an insufficient amount of infusion will have taken place, resulting in a weak coffee brew and the waste of coffee, because more coffee grounds will be required to produce a brew of a certain desired strength. On the other hand, if the water is allowed to remain in the upper bowl for too long a time, an excessive amount of infusion will take place and this will extract undesirable elements from the coffee and result in a coffee brew of poor quality.

It is an object of the invention, therefore, to provide a coffee maker having improved filtering means which will permit the liquid to remain in the upper bowl for the correct amount of time, so as to produce a coffee brew containing the maximum amount of the good qualities of the coffee without any of the undesirable qualities and which is produced from the minimum amount of coffee necessary for the strength of brew desired.

A further object of the invention, is to provide such a coffee maker of improved construction whereby it is rendered more efficient in its operation.

A still further object is to provide novel filtering means, for vacuum type coffee makers, which will retard the flow of liquid from the upper bowl of such a coffee maker to thereby insure more efficient operation and permit proper infusion of the liquid with the coffee grounds so that better coffee will result.

Further objects and advantages of my invention will be more clearly understood from the following description and from the accompanying drawing in which:

Fig. 1 is a view, in central vertical section, of a coffee maker embodying my invention.

Fig. 2 is a side view of the drainer member used in said coffee maker.

Fig. 3 is a bottom view thereof.

Fig. 4 is a flat view of the strainer member used in my invention.

As illustrated in the drawing, the numeral 5 denotes the lower bowl of the coffee maker which is preferably made of glass and has a neck portion 6 with a flared mouth portion 7; a handle 8 being preferably secured to said neck portion by means of a suitable band 9.

An upper bowl 10 is mounted upon the said lower bowl and has a stem 11 depending thereinto. The said stem is provided with a sealing collar 12 which fits between the said stem and the inner surface of the neck portion 6 and supports the upper bowl upon the lower bowl.

In the preferred construction shown, the said upper bowl is provided at the bottom thereof with a depression 13 having an annular shoulder 14 which surrounds the interior of the stem 11 and provides an abutment for the upper end of the seal 12. If desired, the said stem 11 may also be provided with projections 15 for retaining the seal in position thereon.

My improved filter member comprises an imperforate disc portion 16 having a handle 16—a. The said member is preferably provided with an annular lip, or depending flange 17, along the peripheral edge of the bottom thereof, and an axial projection 18 also depending from said bottom; the said flange 17 thereby forming an annular recess 19 which surrounds the said extension.

A strainer member, preferably in the form of a disc 20 having a central opening 21, is positioned between the said filter and the shoulder 14 and extends upwardly between the inner wall of the recess 13 and the outer edge of the disc portion of said filter member with the projection 18 extending through the opening 21.

The projection 18 is tapered to permit the same to be forced into the opening 21 and provide a tight fit for the strainer, around the projection, which will prevent leakage of coffee grounds into the lower bowl.

It will be noted that a marginal portion of the strainer disc fits closely between the peripheral edge of the drainer member and the slightly tapered wall of the recess 13. This portion is thereby retained in vertical position, as at 22, so that the water, on its return from the upper into the lower bowl, must pass edgewise through the marginal portion of the strainer.

When the operation of my improved coffee maker is initiated, water is contained in the lower bowl and coffee grounds in the upper bowl. As the water is heated, expansion of the air in the lower bowl will force the water upwardly through the stem 11 and into the upper bowl where it becomes infused with the coffee grounds therein. When the heat is removed from the lower bowl, the air therein will condense and form a vacuum that will cause the water from the upper bowl to return into the lower bowl. During the movement of the water into the upper bowl, it will be forced through the strainer member 20. After the lower bowl has been removed from the heat, the return of the water into the lower bowl will be delayed by the fact that the drainer member is imperforate and the said water can flow only edgewise through the margin of the strainer 20, which is disposed between the drainer member and the surfaces of the recess 13 and the seat 14. Therefore, since the water must flow through the strainer disc material in an edgewise direction, rather than crosswise, as has heretofore been common in such devices, maximum filtration will be provided while, at the same time, the passage of the water through the strainer member will be retarded and thereby permit more time for the infusion of the coffee in the upper bowl.

It has been found that my improved coffee maker, due to the particular disposition of the strainer member, which will cause the water to flow edgewise therethrough, and the impermeability of the filter member, will permit the water to remain in the upper bowl for just the length of time which is required for an infusion which will extract the maximum amount of the good qualities in the coffee grounds without any of the undesirable qualities. This, therefore, also provides a coffee maker which will produce the maximum amount of good coffee brew from a minimum amount of coffee and thus eliminates a wasting of the desirable qualities in the coffee grounds which would otherwise remain unused if the water were allowed to filter too rapidly through the strainer on its return into the lower bowl.

It is pointed out that the shoulder 14 and the annular rib 17 are purposely made narrow so as to control the distance for which the water has to pass through the strainer material and thereby avoid too long a delay and provide the proper period of time for the infusion. Further, the annular recess 19 prevents contact between that portion of the surface at the lower side of the drainer member 16 and the surface of the strainer 20. This will assure the application of the entire weight of the drainer member upon that portion of the area of the strainer which is disposed between the shoulder 14 and the annular rib 17 of the drainer member.

I claim:

For a coffee maker of the character described, a filter member including a disc shaped portion of imperforate material having an axial projection depending from the bottom thereof, an annular peripheral inverted shoulder in said bottom spaced from and surrounding said projection, and a strainer member comprising a disc of pervious material having a central opening and surrounding said projection and extending along the bottom of said drainer and upwardly along the sides thereof.

FRANK E. WOLCOTT.